(12) United States Patent
Vervier et al.

(10) Patent No.: US 10,440,047 B2
(45) Date of Patent: Oct. 8, 2019

(54) SYSTEMS AND METHODS FOR MAPPING INTERNET PROTOCOL ADDRESSES FOR AN ORGANIZATION

(71) Applicant: Symantec Corporation, Mountain View, CA (US)

(72) Inventors: Pierre-Antoine Vervier, Biot (FR); Yun Shen, Berkshire (GB)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 15/630,131

(22) Filed: Jun. 22, 2017

(65) Prior Publication Data

US 2018/0375894 A1 Dec. 27, 2018

(51) Int. Cl.
*H04L 29/06* (2006.01)
*H04L 29/12* (2006.01)
*G06Q 10/06* (2012.01)

(52) U.S. Cl.
CPC ..... *H04L 63/1441* (2013.01); *G06Q 10/0635* (2013.01); *H04L 61/2007* (2013.01); *H04L 61/2503* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 8,621,604 B2* | 12/2013 | Chien | G06F 21/645 709/229 |
| 9,015,090 B2* | 4/2015 | Chien | H04L 63/1408 706/22 |
| 9,372,994 B1 | 6/2016 | Yampolskiy et al. | |
| 2013/0321458 A1* | 12/2013 | Miserendino | H04L 41/0883 345/629 |
| 2016/0173522 A1* | 6/2016 | Yampolskiy | H04L 63/1433 726/25 |
| 2016/0205126 A1 | 7/2016 | Boyer et al. | |
| 2018/0375822 A1* | 12/2018 | Dahlberg | H04L 61/2007 |

FOREIGN PATENT DOCUMENTS

WO 2018/236774 A1 12/2018

OTHER PUBLICATIONS

Maxmind IP Geolocation: https://www.maxmind.com/en/home/; as accessed on Jun. 22, 2017.

(Continued)

*Primary Examiner* — Christopher A Revak
(74) *Attorney, Agent, or Firm* — FisherBroyles, LLP

(57) ABSTRACT

The disclosed computer-implemented method for mapping Internet Protocol addresses for an organization may include (1) receiving information for an organization from an organizational server, (2) extracting data from a plurality of server data sources associated with the information, (3) mapping the data from the plurality of sever data sources to the information, and (4) determining, based at least in part on the mapped data, a list of IP addresses identifying one or more relationships associated with the organization thereby facilitating performing a security posture analysis against a malicious attack. Various other methods, systems, and computer-readable media are also disclosed.

20 Claims, 6 Drawing Sheets

(56) References Cited

OTHER PUBLICATIONS

Neustar Real-Time Information Services & Analytics: https://www.neustar.biz/; as accessed on Jun. 22, 2017.
BitSight Technologies: https://www.bitsighttech.com/; as accessed on Jun. 22, 2017.
SecurityScorecard: https://securityscorecard.com/; as accessed on Jun. 22, 2017.
QuadMetrics, Inc.: https://www.quadmetrics.com/; as accessed on Jun. 22, 2017.
Liu et al.; Cloudy with a Chance of Breach: Forecasting Cyber Security Incidents; https://www.usenix.org/node/191003; Aug. 12, 2015.
International Search Report and Written Opinion for PCT Application Serial No. PCT/US2018/038137 dated Sep. 17, 2018, 9 pages.

* cited by examiner

IP Address List
124

Organization Primary Domain: Symantec.com
IP Address Range: 63.171.196.0/24

Related Organizational Domain: MessageLabs.com
IP Address Range: 153.134.0.0/16

Organization Hosting Provider: Hosting.com
IP Address Range: 64.69.123.31/32

*FIG. 4*

SYSTEMS AND METHODS FOR MAPPING INTERNET PROTOCOL ADDRESSES FOR AN ORGANIZATION

BACKGROUND

Organizations increasingly utilize software and services that are accessed over a network by large numbers of computing devices using multiple online domains. For example, users within an organization as well as in an organization's supply chain (e.g., vendors, suppliers, and customers) may each have access to sensitive data from different network access points, making each of these parties a potential source of malicious attacks. Thus, identifying these parties is often an initial step in performing a cyber risk assessment for an organization.

Traditional methods for identifying potential sources of malicious attacks for cyber risk assessments fail to provide accurate and consistent results placing the organization at risk of malicious parties accessing sensitive information that may result in unrecoverable losses to the organization. The instant disclosure, therefore, identifies and addresses a need for systems and methods for mapping internet protocol addresses for an organization.

SUMMARY

As will be described in greater detail below, the instant disclosure describes various systems and methods for mapping internet protocol addresses for an organization.

In one example, a computer-implemented method for mapping internet protocol addresses for an organization may include (1) receiving information for an organization from an organizational server, (2) extracting data from a plurality of server data sources associated with the information, (3) mapping the data from the plurality of server data sources to the information, and (4) determining, based at least in part on the mapped data, a list of IP addresses identifying one or more relationships associated with the organization thereby facilitating performing a security posture analysis against a malicious attack.

In one embodiment, the information received from the organizational server may be an organizational name. Additionally or alternatively, the information received from the organizational server may be a primary domain name for the organization.

In some examples, the data extracted from the plurality of server data sources associated with the information may be one or more domain names related to the primary domain name. Additionally or alternatively, the data extracted from the plurality of server data sources associated with the information may be a plurality of IP addresses used by the organization. Additionally or alternatively, the data extracted from the plurality of server data sources associated with the information may be a plurality of IP address ranges owned by the organization. Additionally or alternatively, the data extracted from the plurality of server data sources associated with the information may be a plurality of IP addresses associated with one or more customers of the organization.

In one embodiment, mapping the data from the plurality of server data sources to the information may include associating the organizational name with the primary domain name. Additionally or alternatively, mapping the data from the plurality of server data sources may include (1) associating a plurality of IP addresses used by the organization with a primary domain name for the organization, (2) associating a plurality of IP address ranges owned by the organization with the primary domain name for the organization, or (3) associating a plurality of organization customer IP addresses with organization product data.

Determining, based at least in part on the mapped data, a list of IP addresses identifying one or more relationships associated with the organization may be done in a number of ways. In some examples, determining the list of IP addresses may include assigning an IP address or an IP address range to each of a plurality of domain names associated with the organization.

In one embodiment, a system for mapping internet protocol addresses for an organization may include several modules stored in memory, including (1) a receiving module, stored in memory, that receives information for an organization from an organizational server, (2) an extraction module, stored in memory, that extracts data from a plurality of server data sources associated with the information, (3) a mapping module, stored in memory, that maps the data from the plurality of server data sources to the information, (4) a determining module, stored in memory, that based at least in part on the mapped data, a list of IP addresses identifying one or more relationships associated with the organization thereby facilitating performing a security posture analysis against a malicious attack, and (5) at least one physical processor that executes the receiving module, the extraction module, the mapping module, and the determining module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive information for an organization from an organizational server, (2) extract data from a plurality of server data sources associated with the information, (3) map the data from the plurality of server data sources to the information, and (4) determine, based at least in part on the mapped data, a list of IP addresses identifying one or more relationships associated with the organization thereby facilitating performing a security posture analysis against a malicious attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is an illustration of an example IP address list determined for an organization.

Figure 1:
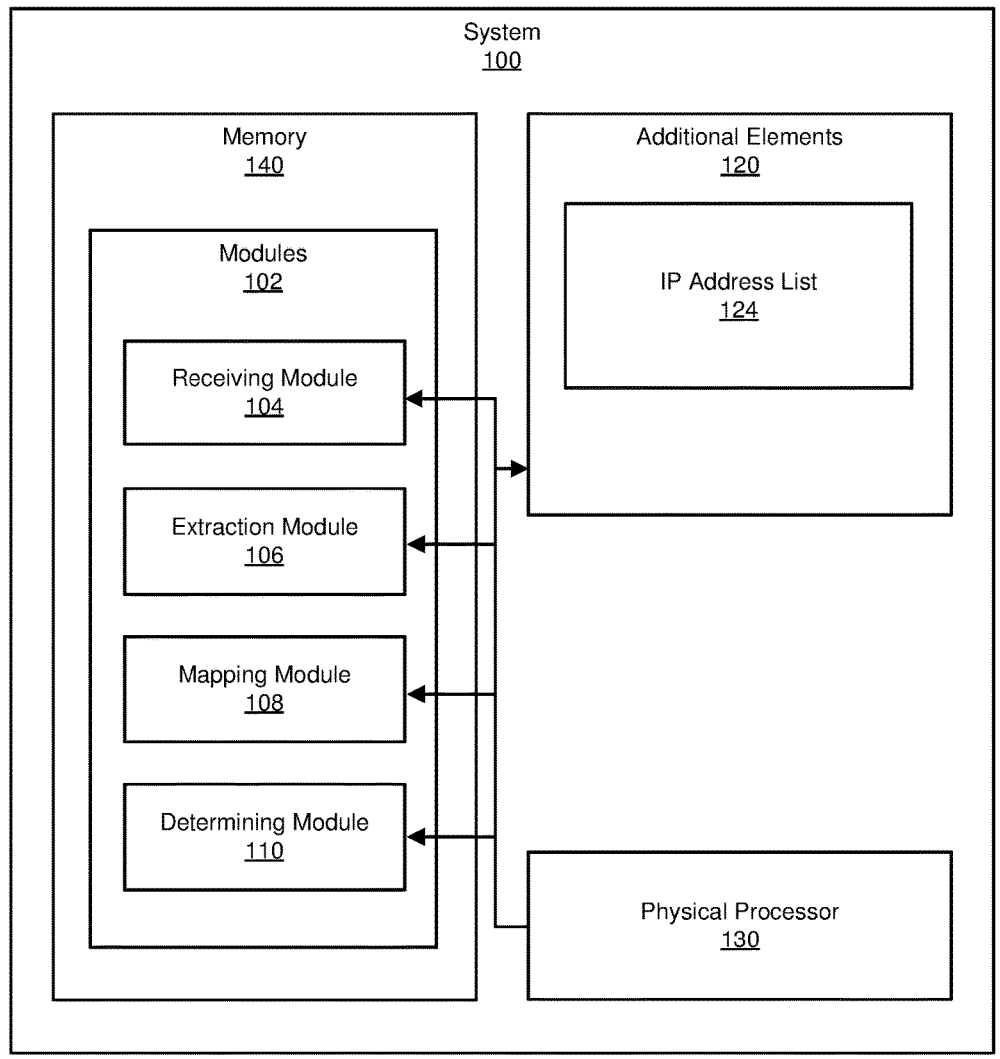
FIG. 1 is a block diagram of an example system for mapping internet protocol addresses for an organization.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for mapping internet protocol addresses for an organization. As will be explained in greater detail below, by mapping Internet Protocol (IP) and domain name information combined from multiple server data sources associated with an enterprise/organization, the systems and methods described herein may be able to identify a comprehensive list of IP addresses and/or IP address ranges that cover the enterprise/organization. By mapping the IP and domain name information in this way, the systems and methods described herein may be able to improve and/or increase the accuracy of identifying organizational IP addresses subject to malicious attacks, thereby reducing inconsistencies or omissions in overall coverage when compared to traditional methods using individual data sources.

In addition, the systems and methods described herein may improve the functioning of a computing device by identifying potentially malicious IP addresses and/or IP address ranges associated with an organization with increased accuracy and thus reducing the computing device's likelihood of infection. These systems and methods may also improve the field of enterprise-level computer security by mapping data from a combination of server data sources associated with an organization, thereby facilitating performing a security posture analysis against a malicious attack.

Figure 2:
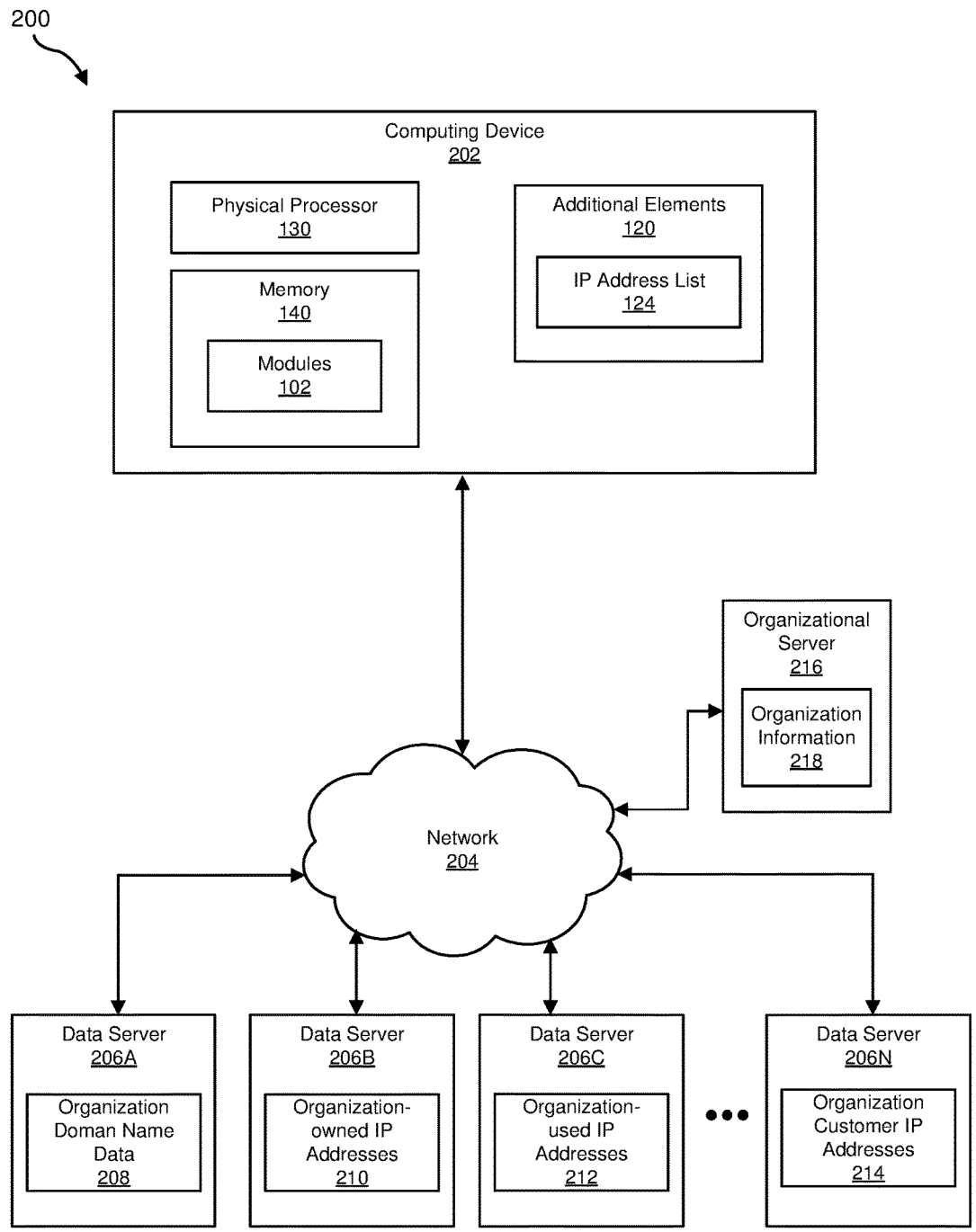
FIG. 2 is a block diagram of an additional example system for mapping internet protocol addresses for an organization.

The following will provide, with reference to FIGS. 1, 2 and 4, detailed descriptions of example systems and data for mapping internet protocol addresses for an organization. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for mapping internet protocol addresses for an organization. As illustrated in this figure, example system 100 may include one or more modules 102 for performing one or more tasks. As will be explained in greater detail below, modules 102 may include a receiving module 104 that receives information for an organization from an organizational server. Example system 100 may also include an extraction module 106 that extracts data from a plurality of server data sources associated with the information. Example system 100 may also include a mapping module 108 that maps the data from the plurality of data sources to the information. Example system 100 may also include a determining module 110 that determines, based at least in part on the mapped data, a list of IP addresses identifying one or more relationships associated with the organization thereby facilitating performing a security posture analysis against malicious attack. Although illustrated as separate elements, one or more of modules 102 in FIG. 1 may represent portions of a single module or application.

The term "organization," as used herein, may include any suitable type of business enterprise including, without limitation, a government, company, club, institution, society, association, political, and/or any other organized group of individuals and/or computing systems organized for any purpose, without limitation. An organization may further include a network that links computing systems particular to and/or related to the organization.

The term "security posture analysis," as used herein, generally refers to one or more actions the systems described herein may take after identifying a list of IP addresses for an organization, any one of which may be potentially used to make a malicious attack against an organization's computer network and therefore presents a security risk. For example, a security posture analysis may include utilizing techniques to forecast and prioritize a fixed list of high-level threats to an organization.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, data servers 206A, 206B, 206C, 206N and/or organizational server 216). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate mapping internet protocol addresses for an organization. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120 such as IP address list 124. IP address list 124 may include a list of IP addresses and/or IP address ranges identifying one or more relationships associated with an organization, thereby facilitating performing a security posture analysis against malicious attack.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with data servers 206A, 206B, 206C, 206N and an organizational server 216 via a network 204. Computing device 202 may include IP address list 124. Data server 206A may include domain (including subdomain) data associated with an organization, such as organization domain data 208. Data server 206B may include a list of IP addresses (or IP address ranges) belonging to an organization, such as organization-owned IP addresses 210. Data server 206C may include a list of IP addresses (or IP address ranges) used by the organization (e.g., IP addresses leased by a third-party hosting provider), such as organization-used IP addresses 212. Data server 206N may include a list of IP addresses used by customers of the organization (e.g., IP addresses associated customers during online registration of products and/or services provided by the organization), such as organization customer IP addresses 215. Organization server 216 may include data used to identify an organization, such as organization information 218. In one example, organization information 218 may be an enterprise name (e.g., ORGANIZATION, INC.). In another example, organization information 218 may be a primary domain name (e.g., ORGANIZATION.COM).

In one example, all or a portion of the functionality of modules 102 may be performed by computing device 202, data servers 206A-206N, organizational server 216 and/or any other suitable computing system. As will be described in greater detail below, one or more of modules 102 from FIG. 1 may, when executed by at least one processor of computing device 202, data servers 206A-206N and/or organizational server 216, enable computing device 202, data servers 206A-206N and/or organizational server 216 to map Internet Protocol addresses for an organization. For example, and as will be described in greater detail below, one or more of modules 102 may cause computing device 202, data servers 206A-206N and/or organizational server 216 to (1) receive information for an organization from an organizational server, (2) extract data from a plurality of server data sources associated with the information, (3) map the data from the plurality of server data sources to the information, and (4) determine, based at least in part on the mapped data, a list of IP addresses identifying one or more relationships associated with the organization thereby facilitating performing a security posture analysis against a malicious attack.

Computing device 202 generally represents any type or form of computing device capable of reading computer-executable instructions. Computing device 202 may be a user computing device, utilized by a cyber risk assessment group that is part of an organization and/or associated with the organization, to identify IP address ranges subject to potential malicious attacks. For example, computing device 202 may include additional elements 120 including IP address list 124, which may be utilized to facilitate the aforementioned identification. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Data servers 206A-206N and organizational server 216 each generally represent any type or form of computing device that is capable of storing domain and IP address data associated with identifying and interacting with users of an organization over a network. Additional examples of data servers 206A-206N and organizational server 216 include, without limitation, security servers, application servers, web servers, storage servers, and/or database servers configured to run certain software applications and/or provide various security, web, storage, and/or database services. Although illustrated as single entities in FIG. 2, each of data servers 206A-206N and organizational server 216 may include and/or represent a plurality of servers that work and/or operate in conjunction with one another.

Network 204 generally represents any medium or architecture capable of facilitating communication or data transfer. In one example, network 204 may facilitate communication between computing device 202, data servers 206A-206N, and organizational server 216. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
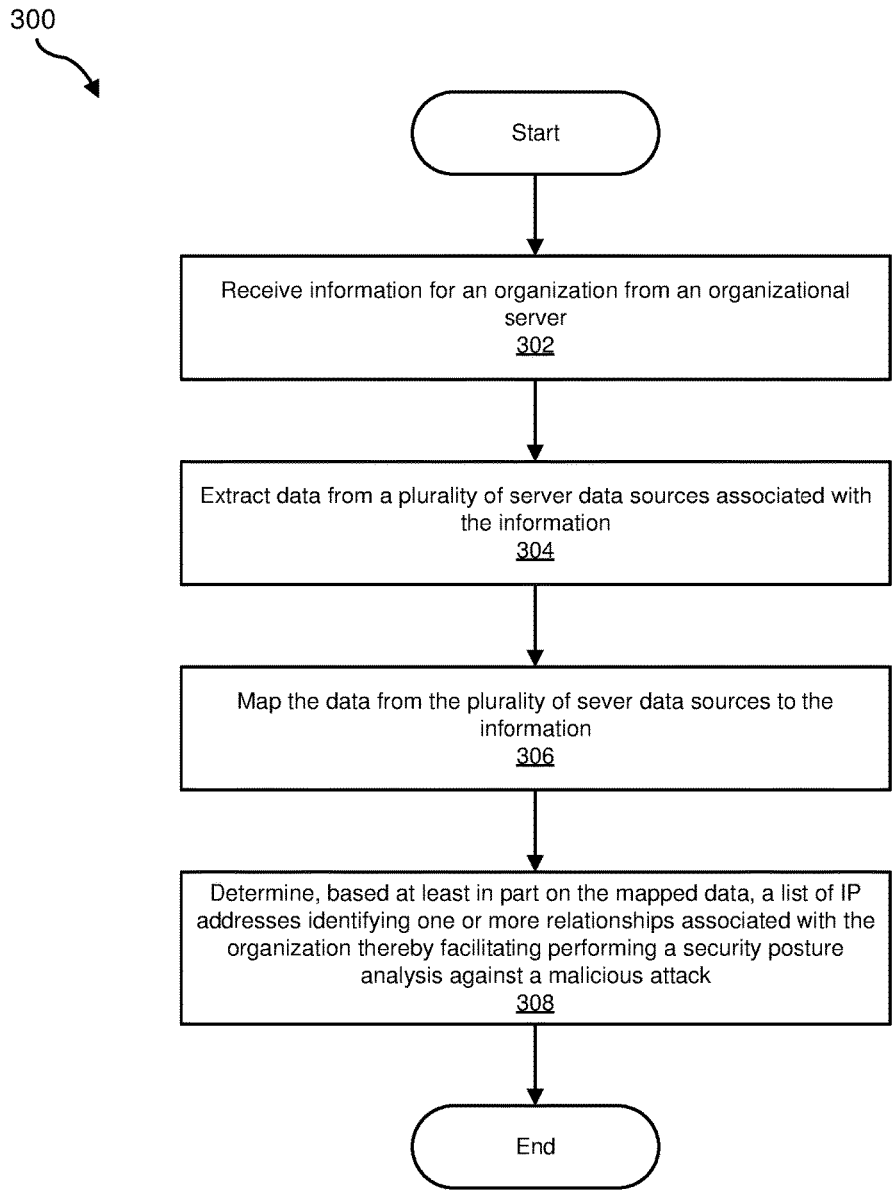
FIG. 3 is a flow diagram of an example method for mapping internet protocol addresses for an organization.

FIG. 3 is a flow diagram of an example computer-implemented method 300 for mapping internet protocol addresses for an organization. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive information for an organization from an organizational server. For example, receiving module 104 may, as part of computing device 202 in FIG. 2, receive organization information 218 from organizational server 216.

Receiving module 104 may receive the organization information 218 in a variety of ways. In some embodiments, receiving module 104 may receive a company or enterprise name (e.g., ORGANIZATION, INC.) from the organizational server 216. In some embodiments, receiving module 104 may receive a primary domain name for the organization (e.g., ORGANIZATION.COM) from the organizational server 216. In some examples, if the receiving module 104 only receives a company or enterprise name, receiving module 104 may communicate this information to mapping module 108 so that the company or enterprise name may be mapped to its corresponding primary domain to generate an organization name, primary domain name pair.

At step 304 in FIG. 3, one or more of the systems described herein may extract data from a plurality of server data sources associated with the information received at step 302. For example, extraction module 106 may, as part of computing device 202 in FIG. 2, extract organization domain name data 208, organization-owned IP addresses 210, organization-used IP addresses 212 and/or organization customer IP addresses 214 from data servers 206A, 206B, 206C and/or 206N, respectively.

Extraction module 106 may extract data from data servers 206A, 206B, 206C and/or 206N in a variety of ways. In some embodiments, the extraction module 106 may utilize the WHOIS protocol to query the data server 206A for domain names related to the organization's primary domain name. As an example, the data server 206A may include one or more WHOIS databases that store the registered users or assignees of an Internet resource, such as a domain name. Upon querying the data server 206A, the extraction module 106 may extract other domains names (e.g., contact email addresses) related to an organization's primary domain name using domain WHOIS data. In some embodiments, the data server 206A may be a business intelligence server providing publicly available information including, without limitation, company profiles, incorporation records, financial information, executive team summaries, past or future acquisition activity and independent analyst reports for various enterprises. As another example, the extraction module 106 may query business intelligence information on the data server 206A for domain name information associated with the organization.

In some embodiments, data server 206B may be an Internet Routing Registry (IRR) server and the extraction module 106 may extract IRR data from the data server 206B to identify organization-owned IP addresses 210. As an example, the IRR data may include all IP address ranges on the Internet belonging to the organization.

In some embodiments, data server 206C may be a domain name system (DNS) server and the extraction module 106 may extract DNS data from the data server 206C to identify organization-used IP addresses 212. As an example, the extraction module 106 may extract from passive DNS data, all hosts on the primary domain (as well as on any subdomains) received at step 302.

In some embodiments, data server 206N may be an intrusion prevention system server associated with the organization. Extraction module 106 may extract telemetry data associated with the organization's customers from the data server 206N to identify organization customer IP addresses 214. As an example, the extracted telemetry data may include product license keys and owner names assigned to users of software provided by the organization.

At step 306 in FIG. 3, one or more of the systems described herein may map the data from the plurality of server data sources extracted at step 304. For example, mapping module 108 may, as part of computing device 202 in FIG. 2, associate the data extracted from the data servers 206A-206N and organizational server 216 with organization domain data.

Mapping module 108 may map data from data servers 206A, 206B, 206C, 206N and organizational server 216 in a variety of ways. In some embodiments, mapping module 108 may map the name of an organization to the primary domain name received in the organization information 218. For example, ORGANIZATION, INC. may be mapped to ORGANIZATION.COM.

In some embodiments, mapping module 108 may map the domain name queried to data server 206A during the extraction of organization domain name data 208. For example, mapping module 108 may correlate a queried domain name with a domain associated with contact email addresses found in server database (e.g., WHOIS) records. Thus, an example mapping output may be (queried) domain <-> (contact email) domain.

In some embodiments, mapping module 108 may map organization-owned IP addresses 210 extracted from data server 206B to the organization domain name received at step 302. For example, mapping module 108 may correlate domains (and subdomains) associated with an organization with contact email addresses found in IRR (i.e., IP address allocation) data extracted from the data server 206B. Thus, an example mapping output may be IP address range <-> (contact email) domain <-> owner.

In some embodiments, mapping module 108 may map organization-used IP addresses 212 extracted from data server 206C to the organization domain name received at step 302. For example, mapping module 108 may correlate passive DNS data containing all IP addresses of hosts on Internet hosting domains (and subdomains) associated with the organization domain name. Thus, an example mapping output may be FQDN (fully qualified domain name)<-> domain <-> IP address <-> IP address range.

In some embodiments, mapping module 108 may map organization customer IP addresses 214 extracted from data server 206N to organization product license keys and owner names. Thus, an example mapping output may be (customer) IP address <-> product license key <-> company name.

At step 308 in FIG. 3, one or more of the systems described herein may determine, based at least in part on the mapped data, a list of IP addresses identifying one or more relationships associated with the organization. An example IP address list 124 is shown in FIG. 4 including IP address ranges associated with an organization's primary domain name, a related organizational domain name, and an organization hosting provider domain name.

In some embodiments, determination module 108 may, as part of computing device 202 in FIG. 2, utilize the combined data mapped from the data servers 206A-206N and the organizational server 216 at step 306 and assign IP addresses or IP address ranges to each of one or more identified company domain names. For example, the determination module 108 may apply label propagation to assign each of a plurality of organization name labels to an IP address or IP address range with a certain probability or confidence score in order to retrieve indirect relationships. An example of assigned organization labels may include the following: (1) if company domain hosted on personal IP address and personal IP address range, then company-owned IP address range; (2) if company "C" domain hosted on shared IP address, then company "C" uses a hosting provider; (3) if company "C" domain hosted on personal IP address but shared IP address range, then company "C uses a hosting/cloud provider; (4) if company "C" IP address range hosting multiple domains belonging to multiple companies, then company "C" is a hosting/cloud provider.

As explained above in connection with method 300 in FIG. 3, the systems and methods described herein may combine multiple data sources to automatically and accurately map an arbitrary organization's IP address attack surface (e.g., all IP addresses associated with an organization) such that all public (or Internet-facing) IP addresses owned or used by an organization may be identified. The mapping of an organization's IP address attack surface may include (1) mapping an organization to a primary domain using an external server data source providing administrative information, (2) building a domain to IP address mapping using additional external server data source information such as passive DNS data, domain WHOIS data, and IRR data, and (3) using telemetry data such as customer public IP addresses associated with an organization. Once the IP addresses of an organization are identified, they may be utilized to perform a security posture analysis for the organization such as, for example, searching for records in datasets that provide information about infected computing devices (which are mainly labeled by their IP addresses).

Figure 5:
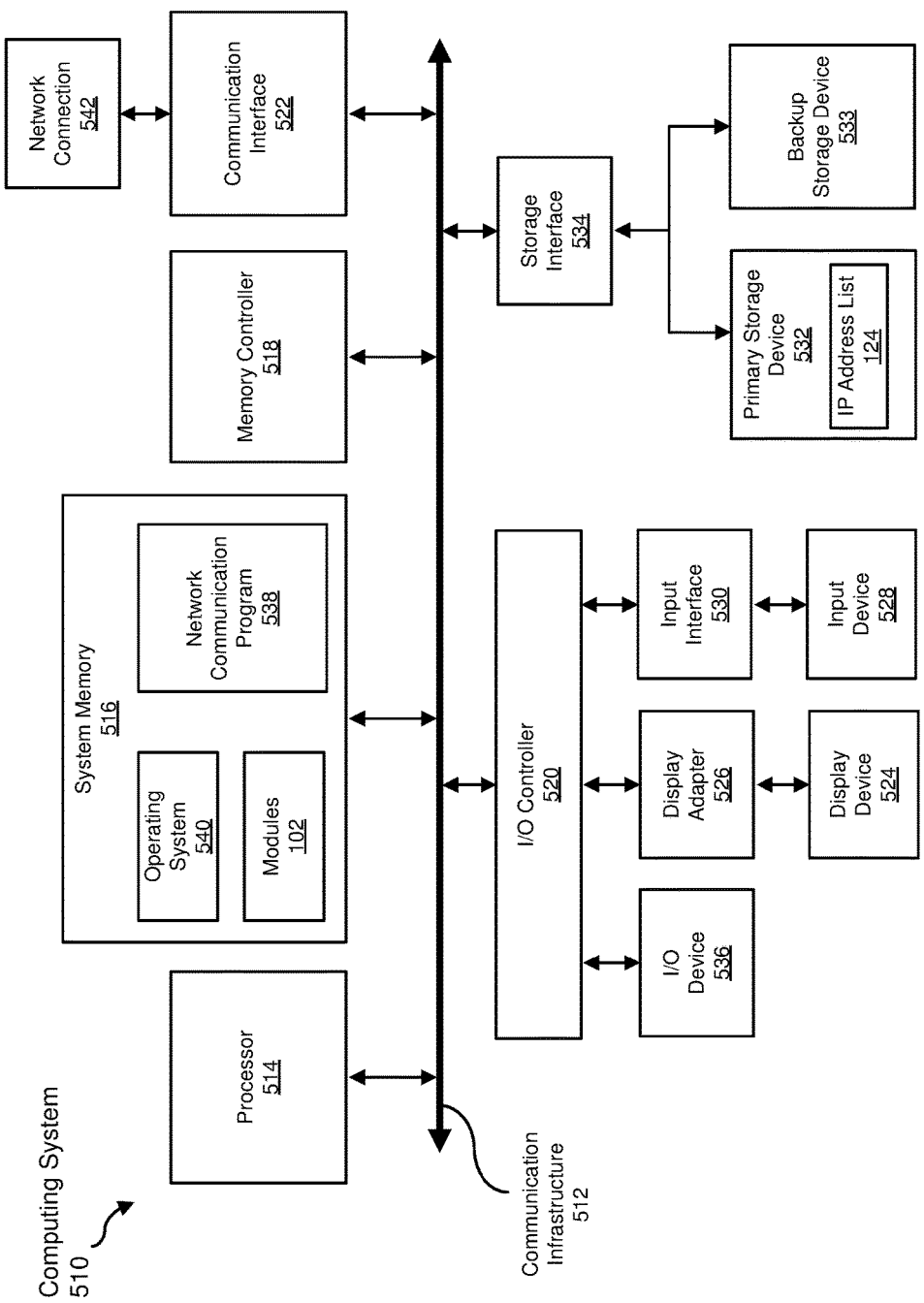
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, IP address list 124 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
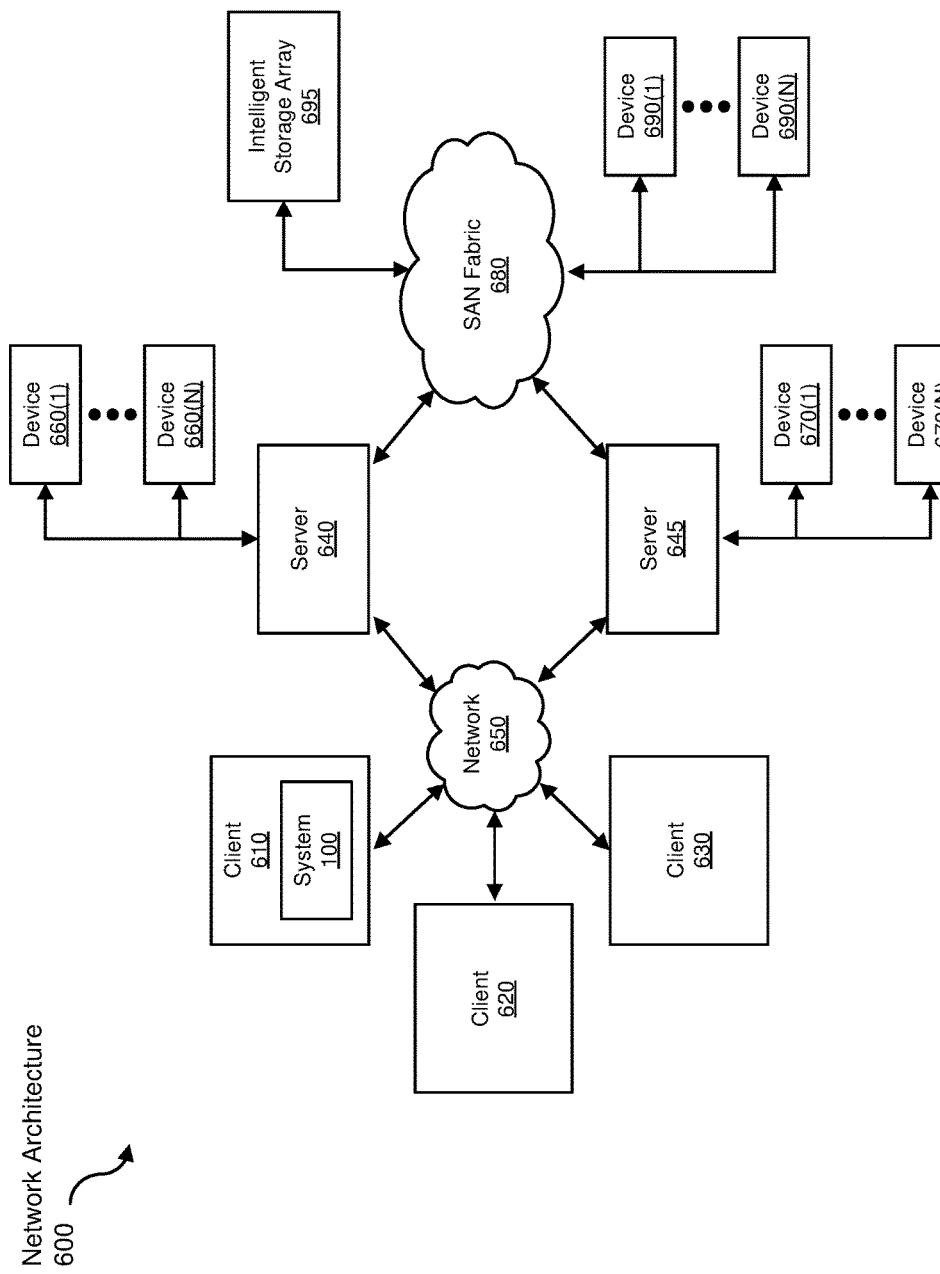
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 610 in FIG. 6. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for mapping Internet Protocol addresses for an organization.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for mapping Internet Protocol addresses for an organization, at least a portion of the method being performed by a computing device comprising at least one processor, the method comprising:
   receiving information for an organization from an organizational server;
   extracting data from a plurality of server data sources associated with the information;
   mapping the data from the plurality of server data sources to the information; and
   determining, based at least in part on the mapped data, a list of IP addresses identifying one or more relationships associated with the organization thereby facilitating performing a security posture analysis against a malicious attack, wherein determining the list of IP addresses comprises assigning the mapped data to at least one of an IP address and an IP address range having a confidence score, wherein assigning the mapped data comprises applying label propagation to assign each of a plurality of organization name labels to the at least one of the IP address and the IP address range based on a relationship with at least one domain hosted by the organization.

2. The computer-implemented method of claim 1, wherein receiving the information for the organization from the organizational server comprises receiving an organizational name.

3. The computer-implemented method of claim 1, wherein receiving the information for the organization from the organizational server comprises receiving a primary domain name for the organization.

4. The computer-implemented method of claim 3, wherein extracting data from a plurality of server data sources associated with the information comprises extracting one or more domain names related to the primary domain name.

5. The computer-implemented method of claim 3, wherein mapping the data from the plurality of server data sources to the information comprises associating an organizational name with the primary domain name.

6. The computer-implemented method of claim 1, wherein extracting data from a plurality of server data sources associated with the information comprises extracting a plurality of IP addresses used by the organization.

7. The computer-implemented method of claim 1, wherein extracting data from a plurality of server data sources associated with the information comprises extracting a plurality of IP address ranges owned by the organization.

8. The computer-implemented method of claim 1, extracting data from a plurality of server data sources associated with the information comprises extracting a plurality of IP addresses associated with one or more customers of the organization.

9. The computer-implemented method of claim 1, wherein mapping the data from the plurality of server data sources to the information comprises:
   associating a plurality of IP addresses used by the organization with a primary domain name for the organization;
   associating a plurality of IP address ranges owned by the organization with the primary domain name for the organization; and
   associating a plurality of organization customer IP addresses with organization product data.

10. The computer-implemented method of claim 1, wherein the relationship with at least one domain hosted by the organization comprises at least one of:
   an organization domain hosted on at least one of a personal IP address and a personal IP address range;
   the organization domain hosted on a shared IP address;
   the organization domain hosted on the personal IP address and a shared IP address range; and
   the IP address range hosting a plurality of domains belonging to a plurality of organizations.

11. A system for mapping Internet Protocol addresses for an organization, the system comprising:
   a receiving module, stored in memory, that receives information for an organization from an organizational server;
   an extraction module, stored in memory, that extracts data from a plurality of server data sources associated with the information;
   a mapping module, stored in memory, that maps the data from the plurality of server data sources to the information;
   a determining module, stored in memory, that based at least in part on the mapped data, determines a list of IP addresses identifying one or more relationships associated with the organization thereby facilitating performing a security posture analysis against a malicious attack, wherein the list of IP addresses is determined by assigning the mapped data to at least one of an IP address and an IP address range having a confidence score, wherein assigning the mapped data comprises applying label propagation to assign each of a plurality of organization name labels to the at least one of the IP address and the IP address range based on a relationship with at least one domain hosted by the organization; and
   at least one physical processor that executes the receiving module, the extraction module, the mapping module, and the determining module.

12. The system of claim 11, wherein the receiving module receives the information for the organization from the organizational server by receiving an organizational name.

13. The system of claim 11, wherein the receiving module receives the information for the organization from the organizational server by receiving a primary domain name for the organization.

14. The system of claim 13, wherein the extraction module extracts the data from the plurality of server data sources associated with the information by extracting one or more domain names related to the primary domain name.

15. The system of claim 11, wherein the extraction module extracts the data from the plurality of server data sources associated with the information by extracting a plurality of IP addresses used by the organization.

16. The system of claim 11, wherein the extraction module extracts the data from the plurality of server data sources associated with the information by extracting a plurality of IP address ranges owned by the organization.

17. The system of claim 11, wherein the extraction module extracts the data from the plurality of server data sources associated with the information by extracting a plurality of IP addresses associated with one or more customers of the organization.

18. The system of claim 11, wherein the mapping module maps the data from the plurality of server data sources to the information by:
   associating a plurality of IP addresses used by the organization with a primary domain name for the organization;
   associating a plurality of IP address ranges owned by the organization with the primary domain name for the organization; and
   associating a plurality of organization customer IP addresses with organization product data.

19. The system of claim 11, wherein the relationship with at least one domain hosted by the organization comprises at least one of:
   an organization domain hosted on at least one of a personal IP address and a personal IP address range;
   the organization domain hosted on a shared IP address;
   the organization domain hosted on the personal IP address and a shared IP address range; and
   the IP address range hosting a plurality of domains belonging to a plurality of organizations.

20. A non-transitory computer-readable medium comprising one or more computer-executable instructions that, when executed by at least one processor of a computing device, cause the computing device to:
   receive information for an organization from an organizational server;
   extract data from a plurality of server data sources associated with the information;
   map the data from the plurality of server data sources to the information; and
   determine, based at least in part on the mapped data, a list of IP addresses identifying one or more relationships associated with the organization thereby facilitating performing a security posture analysis against a malicious attack, wherein determining the list of IP addresses is determined by assigning the mapped data to at least one of an IP address and an IP address range having a confidence score, wherein assigning the mapped data comprises applying label propagation to assign each of a plurality of organization name labels to the at least one of the IP address and the IP address range based on a relationship with at least one domain hosted by the organization.

* * * * *